United States Patent
Filiberti et al.

(10) Patent No.: US 11,597,481 B2
(45) Date of Patent: Mar. 7, 2023

(54) ADAPTABLE CONTROL FOR AUTONOMOUS MARITIME VEHICLES

(71) Applicant: BAE Systems Information and Electronic Systems Integration Inc., Nashua, NH (US)

(72) Inventors: Julia E. Filiberti, Arlington, VA (US); Ronald M. Carvalho, Jr., Bedford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 384 days.

(21) Appl. No.: 16/843,239

(22) Filed: Apr. 8, 2020

(65) Prior Publication Data

US 2021/0316828 A1   Oct. 14, 2021

(51) Int. Cl.
   *B63B 79/40*   (2020.01)
   *B63B 79/10*   (2020.01)
   *B63G 8/00*    (2006.01)

(52) U.S. Cl.
   CPC ............. *B63B 79/40* (2020.01); *B63B 79/10* (2020.01); *B63G 8/001* (2013.01); *B63G 2008/004* (2013.01)

(58) Field of Classification Search
   CPC .... B63G 8/00; B63G 8/001; B63G 2008/004; B63B 79/00; B63B 79/10; B63B 79/40
   USPC .......................................... 701/21
   See application file for complete search history.

(56) References Cited

U.S. PATENT DOCUMENTS

| | | | |
|---|---|---|---|
| 8,880,275 B1 | 11/2014 | Del Savio et al. | |
| 11,169,525 B2 * | 11/2021 | Orivuori | B63B 79/15 |
| 2018/0095467 A1 | 4/2018 | Perrone | |

FOREIGN PATENT DOCUMENTS

EP    2969736 B1    11/2018

OTHER PUBLICATIONS

Albus, James S. and Proctor, Fred G., "A Reference Model Architecture For Intelligent Hybrid Control Systems," IFAC 13th Triennial World Congress, 1996. pp. 4905-4910.
(Continued)

*Primary Examiner* — Lars A Olson
(74) *Attorney, Agent, or Firm* — Finch & Maloney PLLC; Gary McFaline

(57) ABSTRACT

Methods and structures are disclosed for providing autonomous control of an underwater vehicle using a state machine. A controller is used onboard the underwater vehicle and includes a state machine having a plurality of operating states. Each of the plurality of operating states includes one or both of entrance criteria and exit criteria. The controller is configured to transition from executing a first operating state of the plurality of operating states to executing a second operating state of the plurality of operating states in response to the exit criteria of the first operating state and the entrance criteria of the second operating state both being met. The plurality of operating states includes a first portion of operating states associated with a first task, a second portion of operating states associated with a second task, and a third portion of operating states associated with both the first and second tasks.

17 Claims, 9 Drawing Sheets

(56) References Cited

OTHER PUBLICATIONS

Merz, Torsten and Chapman, Scott, "Autonomus Unmanned Helicopter System For Remote Sensing Missions In Unknown Environments," International Archives of the Photogrammetry, Remote Sensing and Spatial Information Sciences, vol. XXXVIII-1/C22, 2011, Sep. 14-16, 2011. pp. 143-148.

Merz, et al., "Control System Framework for Autonomous Robots Based on Extended State Machines," IEEE, 2006. 8 pages.

Herman, Martin and Albus, James S., "Overview of the Multiple Autonomous Underwater Vehicles (MAUV) Project," IEEE 1988. pp. 618-620.

International Search Report, PCT/US21/25981, dated Jan. 10, 2022, 7 pages.

\* cited by examiner

ADAPTABLE CONTROL FOR AUTONOMOUS MARITIME VEHICLES

BACKGROUND

Maritime vehicles, and more specifically unmanned underwater vehicles (UUVs), are useful for performing various complex maritime tasks such as reconnaissance, oceanographic survey, payload deployment/recovery, or mine countermeasures. Unmanned vehicles require some form of control system to carry out the tasks. The control system may be manually operated by a user transmitting commands to the unmanned vehicle, or the control system may be autonomous. Autonomous control systems are desirable due to reduced interaction required from the user, but are often very rigid in their protocols. As will be appreciated, a number of non-trivial issues remain with respect to providing a robust autonomous control system for an underwater vehicle.

BRIEF DESCRIPTION OF THE DRAWINGS

Features and advantages of embodiments of the claimed subject matter will become apparent as the following Detailed Description proceeds, and upon reference to the Drawings, in which:

Figure 1:
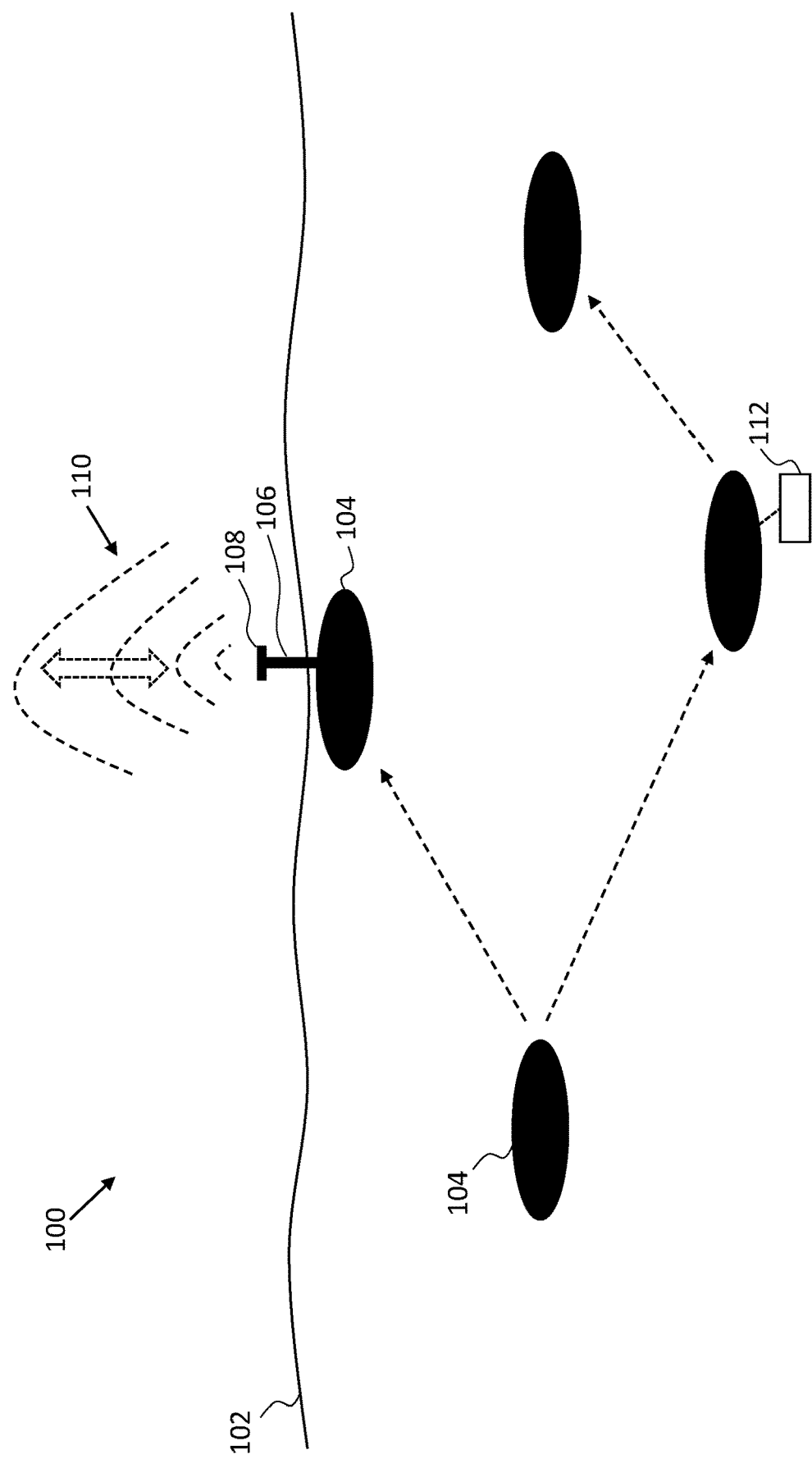
FIG. 1 illustrates an example undersea environment with an underwater vehicle, in accordance with some embodiments of the present disclosure.

Although the following Detailed Description will proceed with reference being made to illustrative embodiments, many alternatives, modifications, and variations thereof will be apparent in light of this disclosure.

DETAILED DESCRIPTION

Methods and structures are disclosed for providing autonomous control of a maritime vehicle using a state machine. According to an embodiment, a controller is used onboard the maritime vehicle and includes a state machine having a plurality of operating states for the vehicle. Each of the plurality of operating states includes one or both of entrance criteria and exit criteria. The entrance and exit criteria may be preconfigured by a user to determine when and how one state transitions to another state. For example, the controller is configured to transition from executing a first operating state of the plurality of operating states to executing a second operating state of the plurality of operating states in response to the exit criteria of the first operating state and the entrance criteria of the second operating state both being met. In cases where the entrance criteria of more than one other state is met, a priority list may be used to determine which of the other states is executed next. The priority list may also be pre-configured by a user, or it may be dynamically formed based on one or more measured parameters regarding underwater vehicle and/or the environment around the underwater vehicle. The plurality of operating states may be configured to address a number of tasks. For instance, in one such embodiment, the plurality of operating states includes a first portion of operating states associated with a first task for which the underwater vehicle is configured to perform, a second portion of operating states associated with a second task for which the underwater vehicle is configured to perform, and a third portion of operating states associated with both the first and second tasks for which the underwater vehicle is configured to perform. In some specific example embodiments, the plurality of operations states includes multi-agent operating states that are activated in the presence of another underwater vehicle and are executed in concert with the other underwater vehicle.

General Overview

As previously noted, there a number of non-trivial issues that remain with respect to controlling underwater vehicles. For example, most control schemes necessitate heavy user involvement throughout the duration of a mission. This involvement can include directly controlling movements of the underwater vehicle or selecting actions to be performed from a list of possible actions. Additionally, control schemes are typically designed to execute a mission as a linear set of tasks, and deviation from the task list is not allowed. If any task is not able to be completed, the underwater vehicle may simply abort the mission. In a more general sense, existing schemes for controlling underwater vehicles lack adaptability and tend to have few mechanisms in place to react to environments which may lead to mission failure.

Thus, techniques are provided herein to control an underwater vehicle using an adaptable state machine that allows for autonomous decision making. Entrance and exit criteria for transitioning from one operating state to another operating state are used to manage the one or more tasks performed by the underwater vehicle. Such criteria may be predetermined by a user before the launch of the vehicle. In some embodiments, the entrance and exit criteria can be dynamically altered or are otherwise adaptable based on measured parameters of the vehicle or its environment to allow for dynamic, autonomous decision making during a mission. The various "states" may represent high-level operation tasks such as "transit" or "hold" or "extraction." One state may be an "abort" state that can be triggered whenever a fail status is received from another state or when a particular task has been completed. Additionally, the state machine implementation for mission control is consistent with current manual submarine planning processes, making the specification of new maritime tasks intuitive to naval planners. For example, explanation of the unmanned system's activities during and post mission is amenable to human understanding since the autonomy software can record its transitions between states and provide the entrance criteria (reasons) explaining why it executed each transition decision. Although state machine implementations like those discussed herein are well-suited for autonomous control of underwater vehicles, it will be understood that other vehicles can also benefit from such autonomous control systems, including aircraft or ground-based vehicles, whether manned or unmanned as will be appreciated. In fact, surface vehicles, such as unmanned surface vehicles, may perform very similar tasks as those of underwater vehicles.

In an example embodiment, a state machine may include a plurality of interconnected states where transition between one operating state and the next is governed by meeting certain exit and/or entrance criteria for the transition to occur. The transitions may be between high-level operating states that can be shared by any number of tasks, such as between a "launch" state and a "transit" state, or between a "transit" state and an "extraction" state where data extraction occurs. According to some embodiments, the transitions may occur between states that are associated with performing a particular maritime task. The tasks can be mission-specific and designed by a user. Still other transitions may occur between task-specific states and shared high-level operating states. The ability to transition between numerous states to perform any number of tasks allows for a high degree of flexibility and autonomy on the part of the underwater vehicle. For example, if entrance criteria is not met to transition to a state associated with performing a first task, the entrance criteria can be checked for transitioning to a different state associated with performing a second task. In this way, the underwater vehicle is not delayed, idle, or prematurely aborting a mission just because it cannot proceed with its current task. The entrance and/or exit criteria are adaptable during a given mission, based on sensed or otherwise learnable data, thus giving the state machine a degree of adaptability.

According to some specific example embodiments, a controller for use on the underwater vehicle includes a state machine having a plurality of operating states for the underwater vehicle, where each of the plurality of operating states includes one or both of entrance criteria and exit criteria. The controller is configured to transition from executing a first operating state of the plurality of operating states to executing a second operating state of the plurality of operating states in response to the exit criteria of the first operating state and the entrance criteria of the second operating state both being met. The plurality of operating states includes a first portion of operating states associated with a first task for which the underwater vehicle is configured to perform, a second portion of operating states associated with a second task for which the underwater vehicle is configured to perform, and a third portion of operating states associated with both the first and second tasks for which the underwater vehicle is configured to perform. Although only two tasks are discussed in this example, the plurality of operating states can allow for the execution of any number of tasks, where each task includes any number of operating states.

According to another example embodiment, a method of autonomously controlling an underwater vehicle includes executing a first operating state of a plurality of operating states associated with the underwater vehicle. The method further includes determining that exit criteria of the first operating state is met and that entrance criteria of a second operating state of the plurality of operating states is met, and in response to the determining, transitioning from executing the first operating state to executing the second operating state. The plurality of operating states comprises a first portion of operating states associated with a first task for which the underwater vehicle is configured to perform, a second portion of operating states associated with a second task for which the underwater vehicle is configured to perform, and a third portion of operating states associated with both the first and second tasks for which the underwater vehicle is configured to perform. The method may be performed by a controller or other hardware such as a field-programmable gate array (FPGA) that includes a state machine with various pre-determined connections between different operating states. In some embodiments, the method also includes detecting the presence of a second underwater vehicle in proximity to the first under underwater vehicle and teaming up with the second underwater vehicle. Teaming up may involve some form of an authentication process with the second underwater vehicle. In response to the teaming, the method includes activating one or more multi-agent states of the plurality of operating states and executing one or more of the one or more multi-agent states.

According to another example embodiment, a computer program product is disclosed that includes one or more non-transitory machine-readable mediums having instructions encoded thereon that, when executed by one or more processors, result in a plurality of operations for autonomously controlling an underwater vehicle to be executed. The plurality of operations may include any of the method operations discussed above.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. When used to describe a range of dimensions, the phrase "between X and Y" represents a range that includes X and Y.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Unmanned Underwater Vehicle (UUV) Overview

FIG. 1 illustrates an example maritime environment 100 in which an underwater vehicle 104 moves beneath the water's surface 102. Underwater vehicle 104 may be any kind of submerged vehicle or platform, such as an unmanned underwater vehicle (UUV). Underwater vehicle 104 may perform any number of tasks after being launched.

A first example task is illustrated in FIG. 1 where underwater vehicle 104 approaches the water's surface 102 and extends a mast 106 having a head region 108 housing one or more electronic devices, according to an embodiment of the present disclosure. In some embodiments, the one or more electronic devices of head region 108 includes one or more RF and/or optical receivers, transmitters, or transceivers for sending/receiving wireless communication signals 110 with, for example, a ship, aircraft, satellite, other underwater vehicle, or a land-based communication station. Data received by underwater vehicle 104 may include, for example, GPS signals to locate the underwater vehicle, messages/communications, or signals to program a processing device onboard underwater vehicle 104. Data transmitted by underwater vehicle 104 may include, for example, messages/communications, or data gathered from sensors onboard underwater vehicle 104 or on head region 108. Alternatively, or in addition, the one or more electronic devices of head region 108 may include one or more other sensors, such as a camera to capture above-surface images, a radiation sensor to detect the presence of above-surface radiation, a temperature sensor to detect the above-surface temperature, and/or a contact sensor or range-finder to detect the above-surface objects. In a more general sense, the one or more electronic devices of head region 108 may include any type of sensor or electronic equipment that can assist in communicating information to underwater vehicle 104 or from underwater vehicle 104, as will be appreciated. In some embodiments, underwater vehicle 104 may approach the water's surface 102 in order to perform reconnaissance or to patrol a given area looking for certain above-water craft.

A second example task is illustrated in FIG. 1 where underwater vehicle 104 navigates or moves to a particular location to either recover or deposit a payload 112, according to an embodiment of the present disclosure. In some embodiments, after completing the recovery/deposit task, underwater vehicle 104 continues on to completing another task or moving to an extraction location. Payload 112 can be any object that is able to be carried by underwater vehicle 104. In one example, payload 112 is an explosive device that is placed at a particular location (e.g. an underwater mine) and armed for detonation after underwater vehicle 104 has left the area. In another example, payload 112 represents a piece of debris from a shipwreck or other vehicle crash that is to be recovered for analysis. In this example, underwater vehicle 104 can retrieve payload 112 and return it to an extraction location where the item of interest is recovered.

Figure 2:
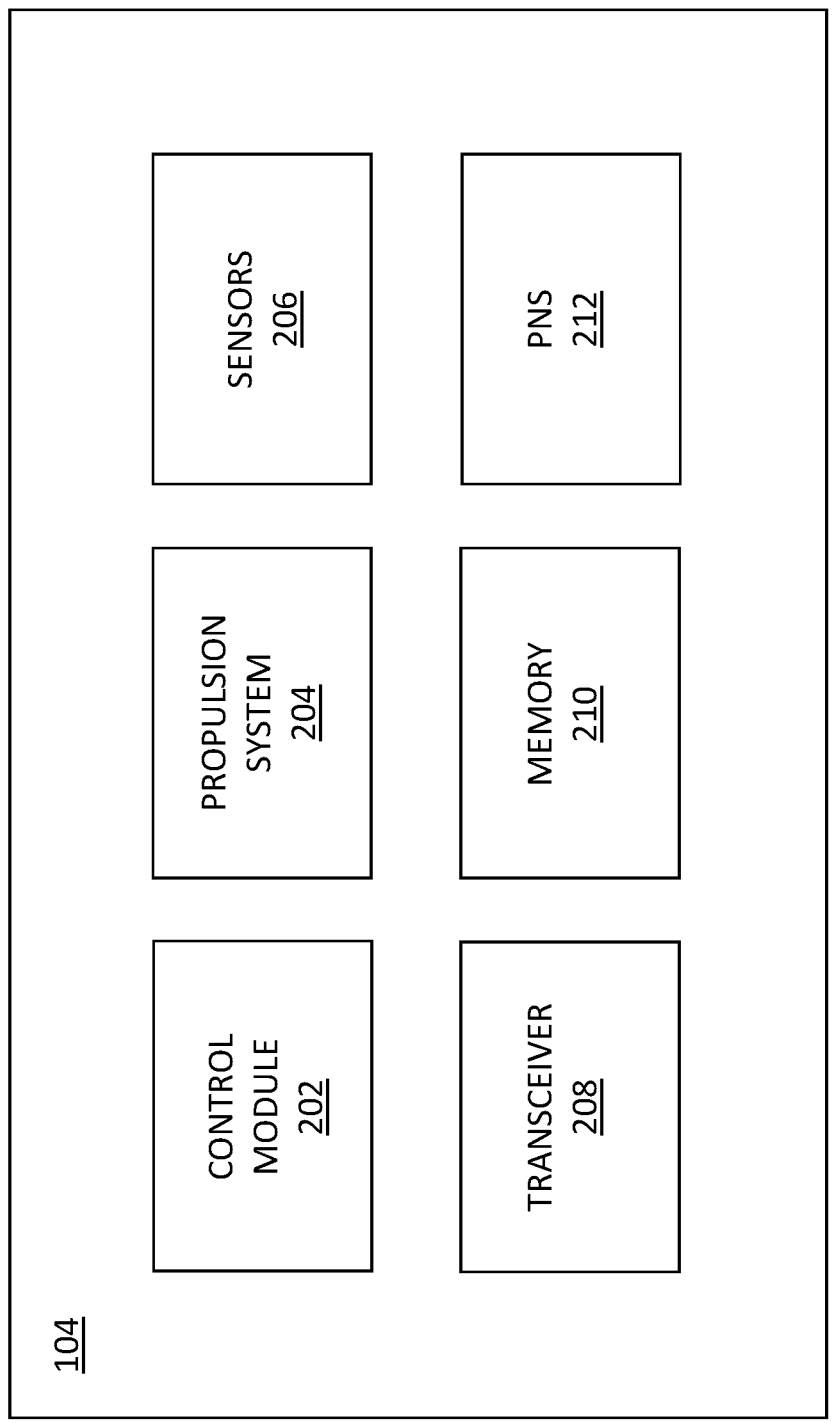
FIG. 2 illustrates select components of an underwater vehicle, in accordance with some embodiments of the present disclosure.

FIG. 2 illustrates components present within underwater vehicle 104, according to some embodiments. Underwater vehicle 104 may include a control module 202, a propulsion system 204, sensors 206, a transceiver 208, a memory 210, and a precision navigation system (PNS) 212.

Control module 202 can include any circuits and/or instructions stored in memory designed to control the operating state of underwater vehicle 104. According to some embodiments, control module 202 includes a state machine that includes a predetermined plurality of states along with entrance and exit criteria for transitioning between various ones of the plurality of states. Some of the states may be shared by more than one task, while other states are particular for a given task. Still other states may be activated only in the presence of another underwater vehicle or any other entity that can join the underwater vehicle in executing the activated states. In some embodiments, control module 202 may represent one or more processing units that includes microcontrollers, microprocessors, application specific integrated circuits (ASICs), and field programmable gate arrays (FPGAs). According to some embodiments, control module 202 determines all of the operations performed by underwater vehicle 104.

Propulsion system 204 may include any number of elements involved in moving underwater vehicle 104 once it is submerged. Accordingly, propulsion system 204 may include a motor, a fuel source, and a propeller or jet nozzle. In some examples, the motor can turn the propeller in the water to move underwater vehicle 104. In some other examples, the motor can activate a pump that forces water out of the jet nozzle to move underwater vehicle 104. In another embodiment, the propulsion system may be a passive, buoyancy-based mechanism as used in some types of undersea gliders.

Sensors 206 may include any number of internal sensors used to measure parameters related to the various subsystems of underwater vehicle 104. Furthermore, sensors 206 may include any number of external sensors that measure parameters related to the aquatic environment around underwater vehicle 104. According to some embodiments, the output of any of sensors 206 is used to adapt the criteria used for transitioning between states of the state machine. For example, if an external sensor receives acoustic signals that indicate the presence of an enemy surface vessel in a particular area, the state machine may be adapted such that certain states involving moving too close to the enemy surface vessel or making too much noise are deactivated until the enemy surface vessel is far enough away. In another example, an internal sensor used to gauge the amount of fuel left may provide a fuel-level measurement that is used to adapt the state machine to abort a task before its completion in order to move underwater vehicle 104 to an extraction location before the fuel runs out. Other examples will be readily apparent of ways to use sensor outputs to adapt the criteria used to determine one or more state transitions in the state machine.

Transceiver 208 may include any hardware used to transmit and/or receive radio frequency (RF) or acoustic signals. In some embodiments, transceiver 208 may be located on a mast that is extended up out of the water when communication is desired. In some embodiments, transceiver 208 is designed to receive acoustic signals through the water that can used to provide location tracking for underwater vehicle 104, or to identify the location of objects or terrain around underwater vehicle 104. In some embodiments, information associated with underwater vehicle 104, such as task progression, sensor observations, vehicle position, etc. may be transmitted by transceiver 208 and received at a remote site. In some embodiments, operating instructions for underwater vehicle 104 may be transmitted from a remote site and received by transceiver 208.

Memory 210 may represent one or more memory devices that can be any type of memory. The memory devices can be one or more of DDR-SDRAM, FLASH, or hard drives to name a few examples. Navigational routes or any other data may be preloaded into memory 210 before underwater vehicle 104 is submerged. In some embodiments, data received or collected from any of the one or more electronic devices on the underwater vehicle 104 are stored in memory 210. Additionally, according to some embodiments, control module 202 records each of the state machine transitions in a report that is stored in memory 210. The report can include a variety of information, including the readings provided by various ones of sensors 206 at different times, the particular states that underwater vehicle 104 operated in and during what times each state was executed, and why a transition was made from one state to another (e.g., showing how the exit and/or entrance criteria was met for the transition), to name a few examples.

PNS 212 may be included to provide additional data input for determining and/or refining the position of underwater vehicle 104. PNS 212 may include one or more inertial sensors that track movement of underwater vehicle 104.

State Machine Examples

Figure 3:
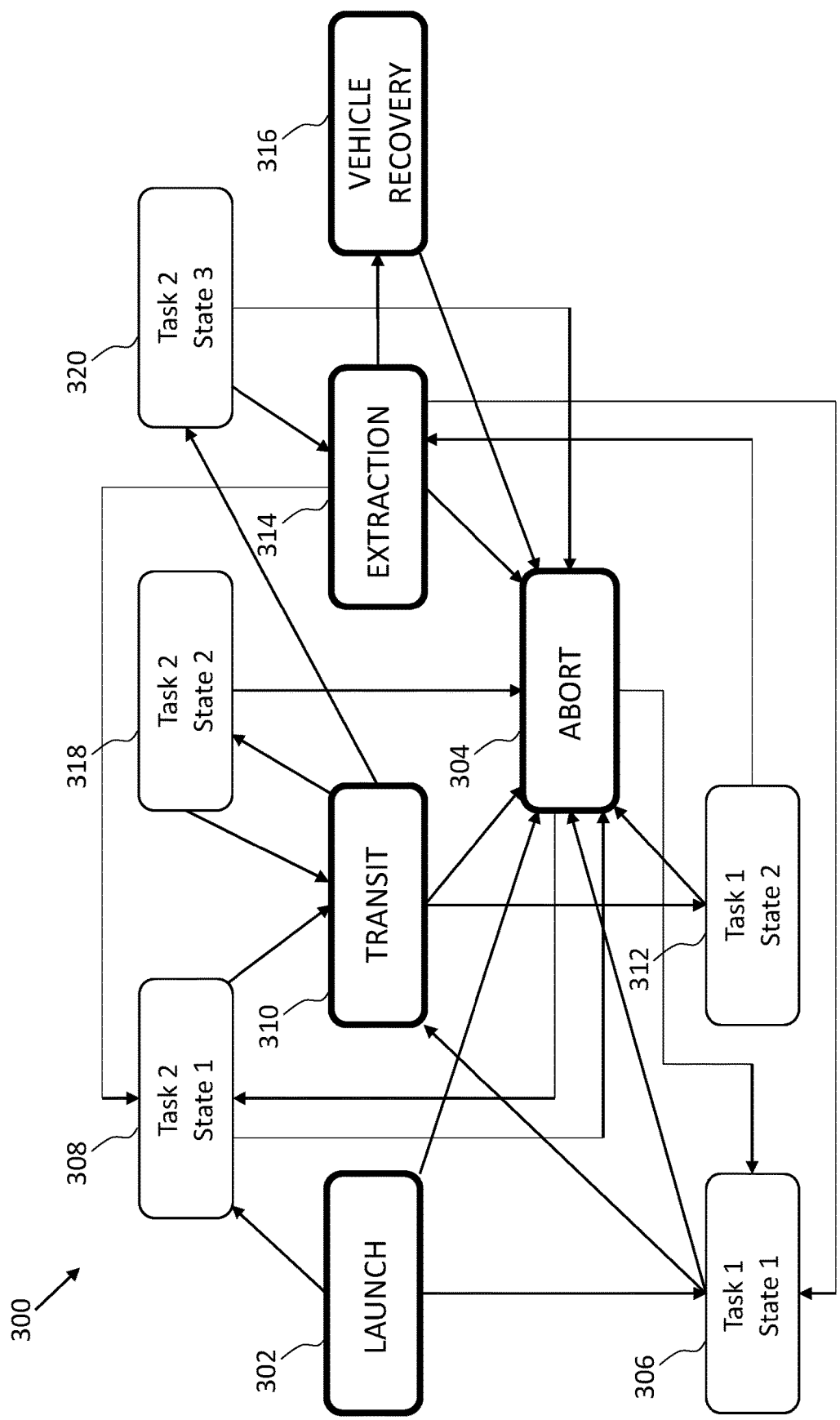
FIG. 3 illustrates a schematic diagram of a state machine for controlling the operation of an underwater vehicle, in accordance with some embodiments of the present disclosure.

FIG. 3 illustrates an example schematic of a state machine 300 that can be used to control the operations of underwater vehicle 104, according to an embodiment. State machine 300 can include any number of operating states with any number of transitions between operating states. The transitions from one state to another may be governed by exit and/or entrance criteria to determine if a transition should occur. According to an embodiment, a user provides the initial state machine blueprint to underwater vehicle 104 before it is launched. This blueprint contains all of the states related to the tasks that the user would like underwater vehicle 104 to perform, including the criteria for when to move between different states of each of the tasks. In some embodiment, the initial state machine blueprint can be adapted based on output provided by one or more sensors onboard underwater vehicle 104.

State machine 300 generally provides a control system for having underwater vehicle 104 perform up to two different tasks. It should be understood that only two tasks are described here for clarity and that any number of tasks, each having any number of states, can be used by the state machine. The states illustrated in state machine 300 can be generally split into three categories: a first set of states that are shared by both tasks (identified with bolded borders); a second set of states associated with performing a first task; and a third set of states associated with performing a second task. The tasks may be any maritime tasks that underwater vehicle 104 can perform. For example, Task 1 may represent delivering a payload to a particular location while Task 2 may represent intelligence gathering of a particular region to identify possible threats in the region.

Operation of underwater vehicle 104 may begin at a launch state 302. According to some embodiments, launch state 302 may involve determining that underwater vehicle 104 has been successfully loaded into the water and that all systems on board are operational. If any systems are found to be malfunctioning, state machine 300 may transition directly to an abort state 304. Otherwise, state machine 300 transitions to executing either first task/first state 306 or second task/first state 308. If the entrance criteria of only one of the possible next states is met, then that state is selected for execution. However, there may be situations where the entrance criteria of more than one other state is met. In such situations, a priority list may be used to determine which state to execute next. In the provided example, after launch state 302 has completed, the entrance criteria of both first task/first state 306 and second task/first state 308 could be met. A priority list would then be used to determine which of the two states has a higher priority. The priority list may be generated by a user and loaded into memory of underwater vehicle 104 before it is launched. In some embodiments, the priority list is dynamically adaptable and can change based on current operating conditions of underwater vehicle 104 and/or outputs received from one or more sensors onboard underwater vehicle 104.

First task/first state 306 may involve preparing underwater vehicle 104 to perform the first task. In one example, the first task involves delivering a payload so state machine 300 would next transition to the shared transit state 310 in order to move to the location of the payload. Once underwater vehicle 104 arrives at the location, the entrance criteria for first task/second state 312 may be met such that the operating state of underwater vehicle 104 transitions to first task/second state 312 where the payload is recovered. Once the payload is secured, the operating state of underwater vehicle 104 may transition to the shared extraction state 314 where underwater vehicle 104 moves to an extraction point to allow for recovery of the payload at the shared vehicle recovery state 316.

Second task/first state 308 may involve preparing underwater vehicle 104 to perform the second task. In one example, the second task involves patrolling a zone to gather intelligence so state machine 300 would next transition to the shared transit state 310 in order to move to the patrol zone. Once the zone has been reached, the entrance criteria for second task/second state 318 may be met such that the operating state of underwater vehicle 104 transitions to second task/second state 318 where underwater vehicle 104 gathers data (e.g., RF signals) over a large area from above the water's surface. If the gathered data identifies the presence of an object of interest, then the operating state may transition back to the shared transit state 310 to move underwater vehicle 104 closer to the object of interest. Once close enough, the operating state may transition to a second task/third state 320 where additional data (e.g., photos or video) is gathered specifically about the object of interest. Once enough data has been collected, or a particular duration of time has passed, or both, the operating state of underwater vehicle 104 may transition to the shared extraction state 314 where underwater vehicle 104 moves to an extraction point to allow for recovery of underwater vehicle 104 at the shared vehicle recovery state 316.

The discussion above provides some possible execution paths through state machine 300, however, the branching paths and adaptable design allow for any number of possible execution paths. Execution of any state can be aborted at any time if the criteria is met. Once within the shared aborted state 304, state machine 300 can transition to try to begin any of the tasks again if the entrance criteria for such tasks is met. In this way, underwater vehicle 104 can attempt to either restart an aborted task or find another task to perform if its previous task is aborted, according to an embodiment. Furthermore, the web-like and multi-branching nature of state machine 300 allows for various operational states to be executed from different tasks before the completion of any one of the tasks, according to an embodiment. For example, while in the shared transit state 310 on its way to recover a payload (e.g., performing the first task), underwater vehicle 104 may stumble across an object of interest that may trigger the entrance criteria of second task/third state 320 (e.g., part of the second task) and transition execution to second task/third state 320 to collect data from the object of interest. Once that task is complete, state machine 300 may eventually return to the shared transit state 310 to continue on its way to the payload site.

As noted above, the transition between any two states may have adaptable criteria which can fundamentally alter the decision making performed by the controller, according to some embodiments. The entrance or exit criteria of any state can be adapted based on one or more parameters of underwater vehicle 104 or of an environment around underwater vehicle 104. Some example parameters measured from within underwater vehicle 104 include one or more of a measured depth of the underwater vehicle, a measured voltage level of one or more systems on board the underwater vehicle, or a measured temperature on board the underwater vehicle. These parameters can influence what states are executed if, for example, executing a particular state could put underwater vehicle 104 at unacceptable risk, or if executing a particular state would consume too many resources. Some other example parameters may include an authentication received from another vehicle in proximity to the underwater vehicle or an indication of the presence of a surface vessel. Receiving an authentication from another vehicle may inform underwater vehicle 104 that it has safely reached an extraction zone, or that it can begin communication with the authenticated vehicle. Receiving an indication of the presence of a surface vessel may cause underwater vehicle 104 to abort trying to surface anywhere too close to the surface vessel or may cause under vehicle 104 to monitor the surface vessel.

State machine 300 may include any number of other operational states, including other shared states to perform tasks that would be common for most missions. For example, state machine 300 can include a "refueling" state that may have entrance criteria associated with a remaining fuel level. The refueling state may involve moving to a particular location to be refueled before continuing on with whatever task was interrupted to enter the refueling state. Autonomous refueling can enable infinitesimal transitions through state machine 300 in the absence of physical faults, thus supporting long duration maritime autonomy missions.

Figure 4:
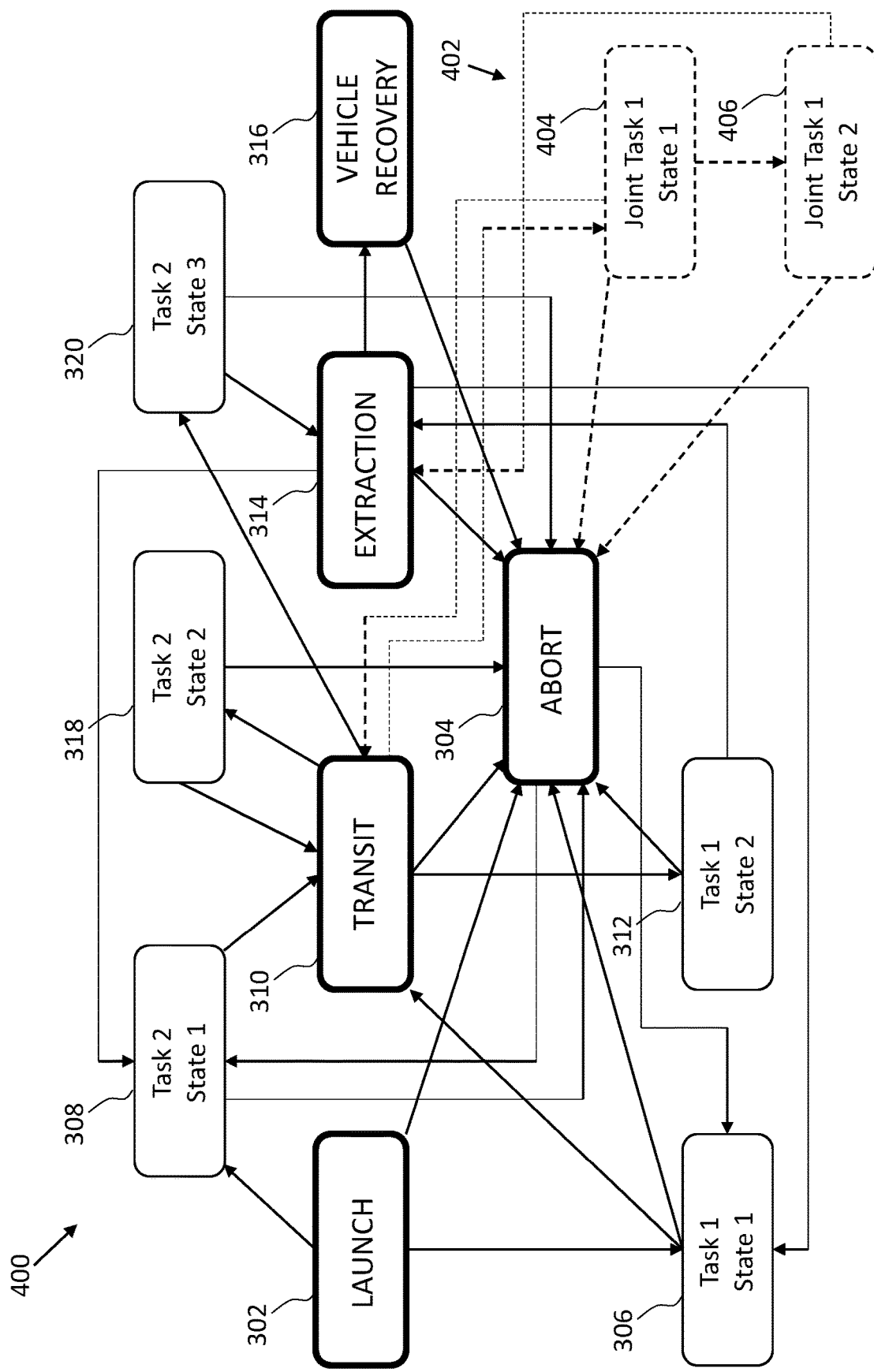
FIG. 4 illustrates a schematic diagram of another state machine for controlling the operation of an underwater vehicle, in accordance with some embodiments of the present disclosure.

FIG. 4 illustrates another example schematic of a state machine 400 that can be used to control the operations of underwater vehicle 104, according to an embodiment. State machine 400 includes many of the same states as state machine 300 and are similarly labeled. The description of these states is not repeated here. However, state machine 400 includes one or more multi-agent states 402 that are activated when underwater vehicle 104 is in the proximity of another friendly underwater vehicle, according to an embodiment. Such multi-agent states 402 may have entrance criteria that includes being paired with another underwater vehicle before the multi-agent states 402 can be executed.

According to an embodiment, state machine 400 includes a "Seek Teammates" operating state that is executed after launch and continually scans for other vehicles to potentially team up with. In some embodiments, the teammate seeking operations may be performed as part of the transit state 310. When another vehicle is identified, an authentication process can be performed via any known authentication handshake method between the two vehicles. If the other vehicle is determined to be a friendly vehicle, then multi-agent states 402 can be activated and the entrance criteria for any of multi-agent states 402 can be considered when transitioning to another operating state. If, for example, entrance criteria are met for a first joint task/first state 404, the controller may transmit a signal to the other friendly vehicle to determine if it is available to assist with the joint task. If the other vehicle is available, then the operation state of underwater vehicle 104 can transition to execute first joint task/first state 404 with the help of the other vehicle. Once joint task/first state 404 is completed (e.g., meets its exit criteria), the state machine may transition to executing first joint task/second state 406, or may transition back to the shared transit state 310. First joint task/second state 406 may provide instructions for executing another portion of the first task with the aid of the other friendly vehicle. Any number of multi-agent states 402 can exist with any number of branching pathways between them, such that they may operate just like the state transitions of a solo vehicle. Furthermore, although only one joint task is illustrated, it will be understood that any number of joint tasks can be performed, each joint task having any number of operating states.

Once the joint task has been completed, another joint task can be performed or the team may disband such that underwater vehicle 104 transitions to the abort state 304 and can begin any of its other individual tasks. Additionally, if contact with the other vehicle is lost for any reason during execution of any of multi-agent states 402, the operation state of underwater vehicle 104 can transit to the abort state 304. It should be noted that the discussion regarding adaptability also applies to multi-agent states 402, such that the entrance and/or exit criteria of any of multi-agent states 402 can be changed based on output received from sensors on board underwater vehicle 104 and/or signals received from the other vehicle.

Figure 5:
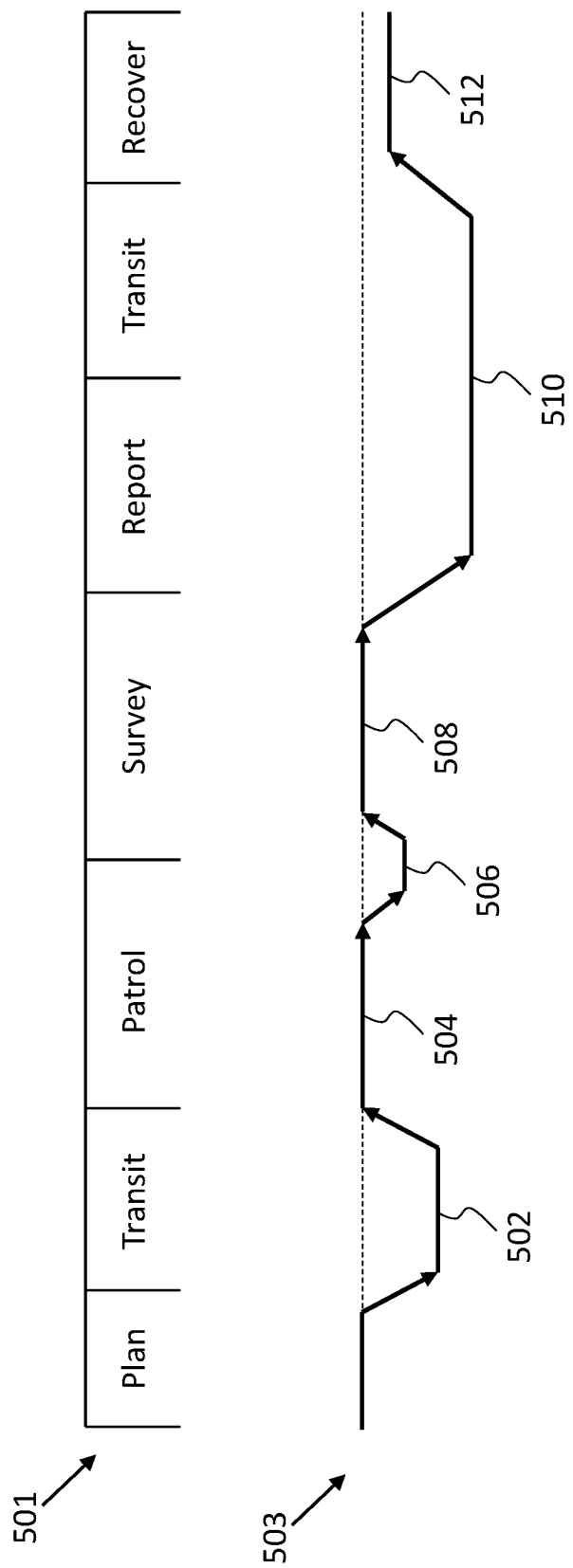
FIG. 5 illustrates an example set of tasks performed in order as part of a particular mission, in accordance with an embodiment of the present disclosure.

FIG. 5 illustrates an example mission timeline 501 having various stages of different operating states for the underwater vehicle along with a corresponding depth chart 503 illustrating the general depth of the underwater vehicle for each of the stages of mission timeline 501. According to an embodiment, the mission may begin with a planning stage that may correspond roughly to the launch state 302 of state machine 300. In the planning stage, the underwater vehicle may perform diagnostic checks on its systems to ensure it can carry out the programmed mission. In some embodiments, the planning stage involves loading the mission parameters and state machine data into the underwater vehicle while it is on a launch platform or after in-water deployment via human-machine communication interfaces. After planning is complete and the underwater vehicle has been placed in the water, it may dive down to a first depth 502 to avoid detection.

The next mission stage is a transit stage where the underwater vehicle moves to another area to begin patrolling. According to some embodiments, the underwater vehicle remains at first depth 502 during the transit stage.

Once the underwater vehicle reaches its predetermined patrol area, it transitions to the patrol stage where it raises up to a second depth 504 at or near to the water's surface. In another embodiment, the underwater vehicle transitions to the patrol stage in response to receiving certain data from one or more of its sensors. During the patrol stage, the underwater vehicle may raise a mast above the water's surface to collect RF signals from above the water's surface. These RF signals may be used to determine the presence of any other vehicles or objects of interest in the area. The patrol stage may involve the underwater vehicle moving in a certain pattern around a particular area.

If the underwater vehicle detects the presence of another vehicle or object of interest, then it may transition to the survey stage, according to an embodiment. In some embodiments, the survey stage involves moving the underwater vehicle closer to the vehicle or object of interest to collect other types of data about the vehicle or object of interest. Accordingly, the underwater vehicle may dive down to a third depth 506 in order to move closer to the vehicle or object of interest to avoid detection. Once the underwater vehicle is close enough, it may rise back to a fourth depth 508 at or near the water's surface in order to perform the data collection portion of the survey stage, according to an embodiment. A mast from the underwater vehicle may again be used to extend above the water's surface for collecting the additional data about the vehicle or object of interest. Data collecting during the survey stage may involve capturing photographs, video, or some other content to provide information about the vehicle or object of interest.

Once enough survey data has been collected, and/or a certain time period has passed, the underwater vehicle may transition to a report stage as part of its mission. Reporting may be performed at a fifth depth 510 that is chosen to provide the clearest communication with another receiver. The communication may be performed acoustically through the water. In some embodiments, communicating the data captured during the patrol and survey stages may be one of the operations performed during the extraction state 314 from state machine 300.

Once the data has been effectively communicated, the underwater vehicle may begin another transit stage towards a recovery zone at the same fifth depth 510. This transit stage may be another one of the operations performed during the extraction state 314 from state machine 300. Once the underwater vehicle reaches the recovery zone, it may transition to the recover stage where it rises to a sixth depth 512 more suitable for the underwater vehicle to be recovered from the water. The recover stage may be similar to the vehicle recovery state 316 of state machine 300.

As is to be appreciated based on the description above, a state machine implementation may be used to carry out the various stages of mission timeline 501 with transitions between the stages being governed by the movement from one operating state to the next in the state machine. The entrance and/or exit criteria of the various states can be used to control when and how the underwater vehicle completes each of the stages of its mission. Furthermore, if the mission is aborted during any of the stages, the state machine allows the underwater vehicle to either reattempt the mission or try to complete another task that is part of the state machine.

Methodology

Figure 6:
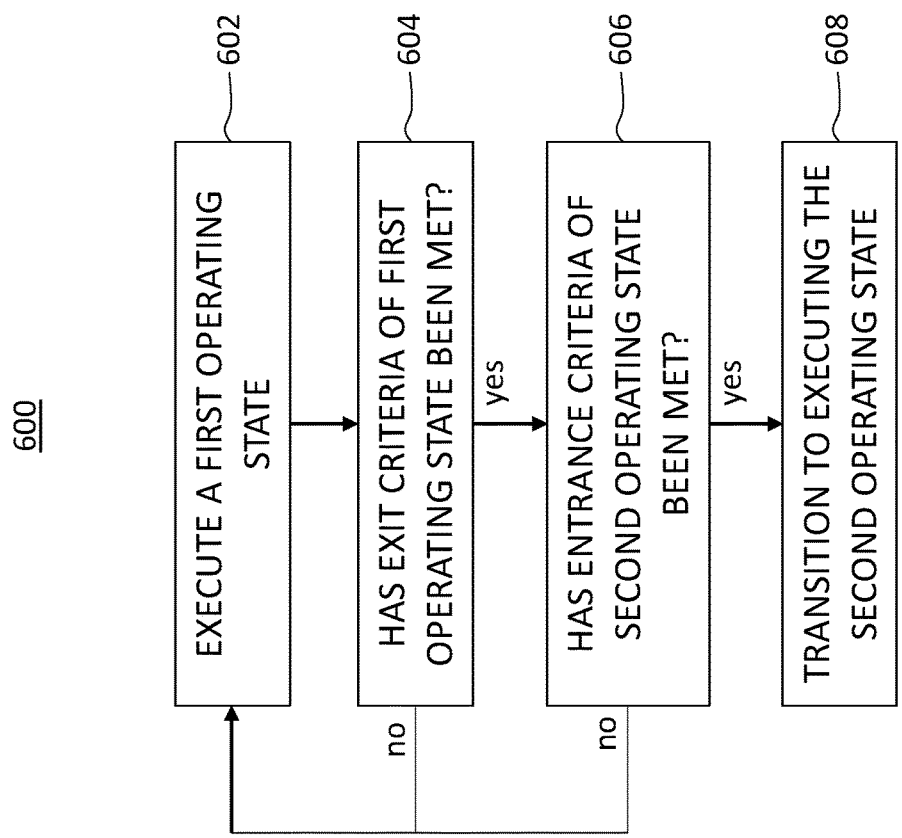
FIG. 6 is a flowchart illustrating an example method of using a state machine to control an underwater vehicle, in accordance with some embodiments of the present disclosure.

FIG. 6 illustrates an example method 600 for controlling the operation of an underwater vehicle, in accordance with certain embodiments of the present disclosure. As can be seen, the example method includes a number of phases and sub-processes, the sequence of which may vary from one embodiment to another. However, when considered in the aggregate, these phases and sub-processes form a process for controlling the underwater vehicle using a state machine implementation as described above, for example, with reference to FIG. 3 or FIG. 4. However other system architectures can be used in other embodiments, as will be apparent in light of this disclosure. To this end, the correlation of the various functions shown in FIG. 6 to the specific components illustrated in the other figures is not intended to imply any structural and/or use limitations. Numerous variations and alternative configurations will be apparent in light of this disclosure. According to an embodiment, method 600 describes a single transition from one state to another state and may not describe all of the possible complexities of the state machine for clarity.

Method 600 may begin at operation 602 where a first operating state of the state machine is executed. This first operating state may represent any of the states within the state machine, including the first operating state executed upon launching the underwater vehicle.

Method 600 continues with operation 604 where a determination is made about whether the exit criteria of the first operating state has been met. If the exit criteria has not been met, then the method loops back to operation 602 where the first operating state is being executed. If the exit criteria has been meet, then method 600 proceeds to operation 606. The exit criteria may be unique to each of the states within the state machine. For example, the exit criteria of the first launch state may involve confirming that all subsystems aboard the underwater vehicle are operational. In another example, the exit criteria of a specific task state may involve some confirmation that the steps being performed in the specific task state have been completed. In some embodiments, each of the states within the state machine can include exit criteria associated with an error or something similar that signifies a failure in order to transition immediate to the abort state.

As noted above, if the exit criteria of the first operating state has been meet, then method 600 proceeds to operation 606 where a determination is made whether the entrance criteria of a second state has been met. In some embodiments, the entrance criteria of the second state may be the same as the exit criteria of the first state, such that the transition occurs once the exit criteria of the first state is met. In some embodiments, the entrance criteria of the second state may require some task-specific parameters to be at certain values before operation will transition to the second state. If the entrance criteria has not been met, then the method loops back to operation 602 where the first operating state is being executed. If the entrance criteria has been meet, then method 600 proceeds to operation 608 where the second state is executed.

Figure 7:
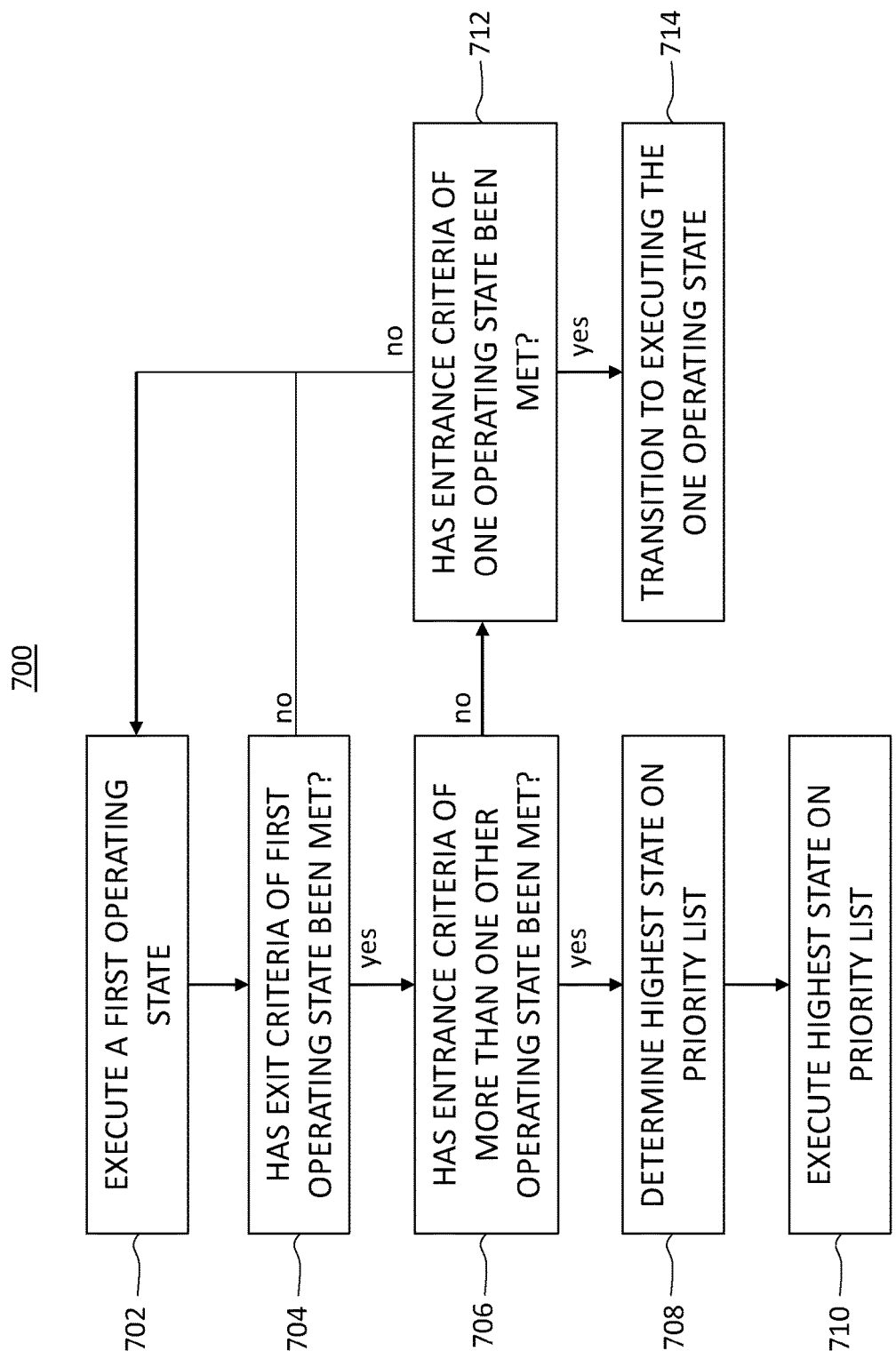
FIG. 7 is a flowchart illustrating another example method of using a state machine to control an underwater vehicle, in accordance with some embodiments of the present disclosure.

FIG. 7 illustrates an example method 700 for controlling the operation of an underwater vehicle, in accordance with certain embodiments of the present disclosure. As can be seen, the example method includes a number of phases and sub-processes, the sequence of which may vary from one embodiment to another. However, when considered in the aggregate, these phases and sub-processes form a process for controlling the underwater vehicle using a state machine implementation as described above, for example, with reference to FIG. 3 or FIG. 4. However other system architectures can be used in other embodiments, as will be apparent in light of this disclosure. To this end, the correlation of the various functions shown in FIG. 7 to the specific components illustrated in the other figures is not intended to imply any structural and/or use limitations. Numerous variations and alternative configurations will be apparent in light of this disclosure. According to an embodiment, method 700 further illustrates the decision-making process when the entrance criteria of more than one other state is met.

Method 700 may begin at operation 702 where a first operating state of the state machine is executed. This first operating state may represent any of the states within the state machine, including the first operating state executed upon launching the underwater vehicle.

Method 700 continues with operation 704 where a determination is made about whether the exit criteria of the first operating state has been met. This operation is functionally the same as operation 604 from method 600 and is not described again here.

Method 700 proceeds with operation 706 if the exit criteria from the first operating state was met. Operation 706 involves determining if the entrance criteria of more than one other operating state is met. This may occur, for example, in situations where multiple tasks have been programmed and the underwater vehicle is in a situation where it can begin or transition to numerous possible tasks. In another example, there may be multiple states within a given task that could be selected for execution at a given time.

If the entrance criteria of more than one other operating state has been met, then method 700 proceeds to operation 708 where one of the operating states is selected for execution. According to an embodiment, a priority list is used to determine which of the operating states to execute next in the event that the entrance criteria of more than one operating state is met. The priority list may be generated by a user and loaded into memory of the underwater vehicle before it is launched. In some embodiments, the priority list is dynamically adaptable and can change based on current operating conditions of the underwater vehicle and/or outputs received from one or more sensors onboard the underwater vehicle. Once the state with the highest priority is identified from the priority list, method 700 proceeds to operation 710 where the highest priority state is executed.

If the entrance criteria of more than one other operating state has not been met, then method 700 proceeds from operation 706 to operation 712 where another determination is made whether the entrance criteria of one operating state is met. If not, then no other operating states have entrance criteria that is met, so method 700 loops back to operation 702 to continue execution of the first operating state. If one other operating state does have entrance criteria that is met, then method 700 proceeds to operation 714 where the one other operating state is executed.

Figure 8:
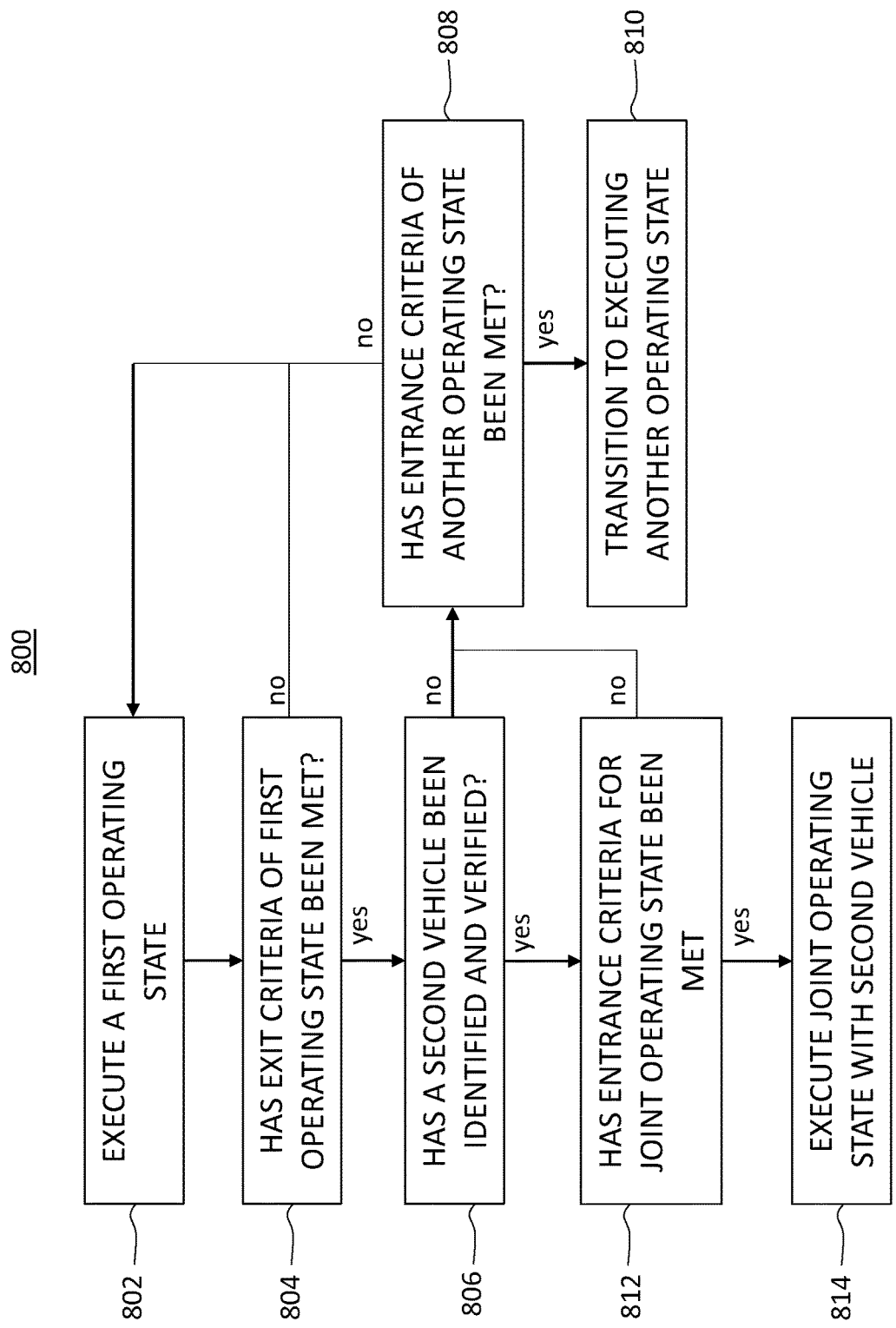
FIG. 8 is a flowchart illustrating another example method of using a state machine to control an underwater vehicle, in accordance with some embodiments of the present disclosure.

FIG. 8 illustrates an example method 800 for controlling the operation of an underwater vehicle, in accordance with certain embodiments of the present disclosure. As can be seen, the example method includes a number of phases and sub-processes, the sequence of which may vary from one embodiment to another. However, when considered in the aggregate, these phases and sub-processes form a process for controlling the underwater vehicle using a state machine implementation as described above, for example, with reference to FIG. 3 or FIG. 4. However other system architectures can be used in other embodiments, as will be apparent in light of this disclosure. To this end, the correlation of the various functions shown in FIG. 8 to the specific components illustrated in the other figures is not intended to imply any structural and/or use limitations. Numerous variations and alternative configurations will be apparent in light of this disclosure. According to an embodiment, method 800 further illustrates the decision-making process when another vehicle is involved as a potential teammate for completing tasks.

Method 800 may begin at operation 802 where a first operating state of the state machine is executed. This first operating state may represent any of the states within the state machine, including the first operating state executed upon launching the underwater vehicle.

Method 800 continues with operation 804 where a determination is made about whether the exit criteria of the first operating state has been met. This operation is functionally the same as operation 604 from method 600 and is not described again here.

Method 800 proceeds with operation 806 if the exit criteria from the first operating state was met. Operation 806 involves determining if a second vehicle has been identified and verified (e.g., can be teamed with). The second vehicle can be another underwater vehicle or a surface vessel. The second vehicle may be identified via an electronic or acoustic signature given off by the second vehicle. Authentication with the second vehicle can be performed via any known handshake method between the two vehicles. In some embodiments, more than one other vehicle can be identified and verified for teaming up to complete joint tasks.

If a second vehicle has not been identified and/or verified, then method 800 proceeds to operation 808 where a determination is made whether the entrance criteria of another operating state has been met. Operation 808 may be functionally the same as operation 606 from method 600. Similarly, if entrance criteria of another state is not met, method 800 loops back to operation 802 and if the entrance criteria of another state is met, then method 800 continues to operation 810 where another operating state is executed.

If a second vehicle has been identified and verified, then method 800 proceeds from operation 806 to operation 812 where a determination is made whether the entrance criteria of a joint operating state has been met. The joint operating state only becomes activated after successful verification of another vehicle, according to an embodiment. If the entrance criteria for the joint operating state is not met, then method 800 can continue with operation 808 (e.g., individual operation if no joint tasks are available). In some embodiments, more joint tasks may be tested to see if the entrance criteria of any joint task can be met. If the entrance criteria for the joint operating state is met, then method 800 continues to operation 814 where the joint operating state can be executed with help from the second vehicle.

Each of method 600, 700, and 800 is illustrated separately to highlight different decision-making operations performed by the controller when implementing the state machine. However, combinations of the various operations between any of methods 600, 700, and 800 are possible without limitation.

Example Computing Platform

Figure 9:
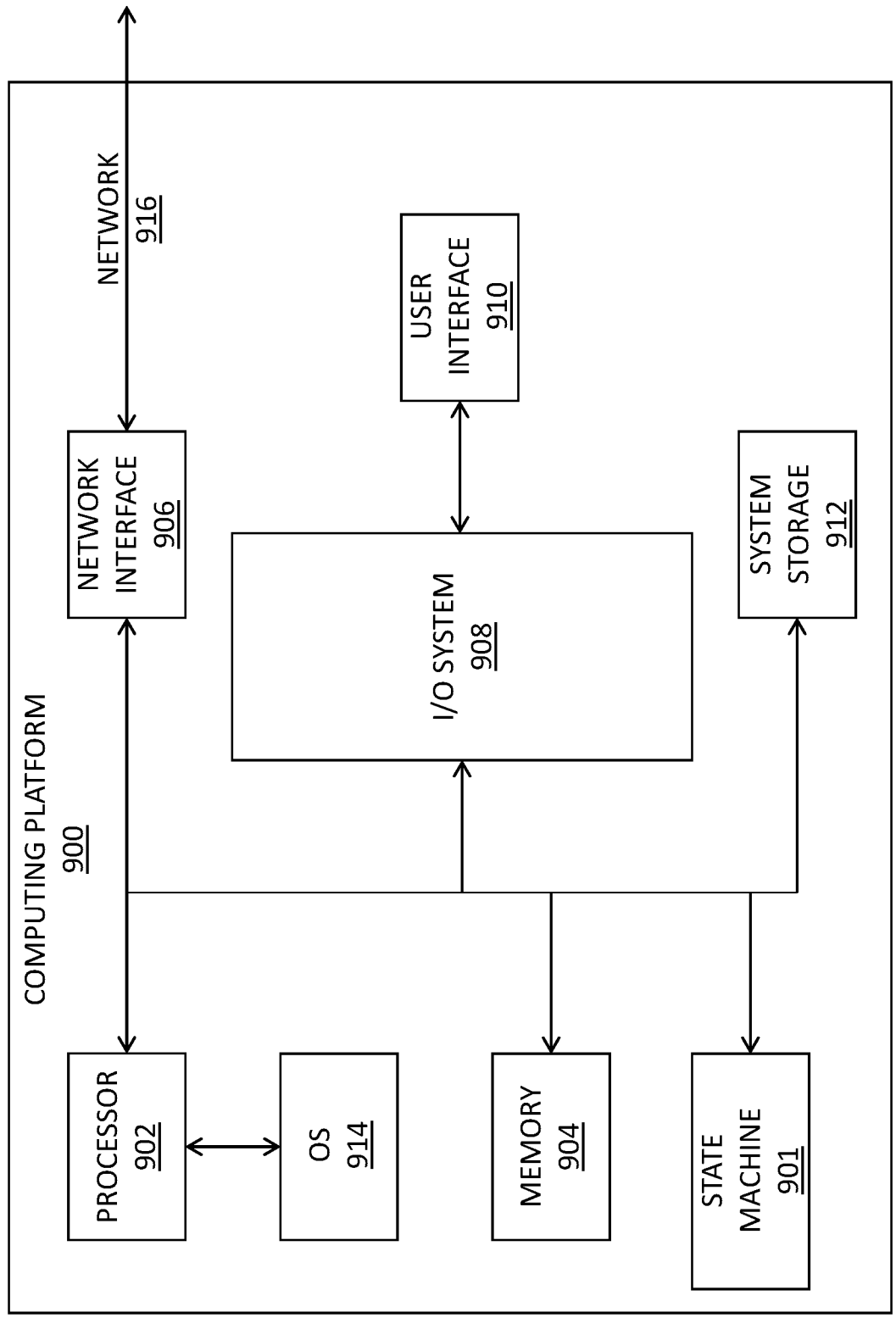
FIG. 9 illustrates an example computing platform that can be used to implement one or more of the embodiments of the present disclosure.

FIG. 9 illustrates an example computing platform 900 that interfaces with a state machine 901, configured in accordance with certain embodiments of the present disclosure. In some embodiments, computing platform 900 may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, wearable device, embedded system, and so forth. Any combination of different devices may be used in certain embodiments. Computing platform 900 may represent any type of computing system on board a vehicle, such as an underwater vehicle.

In some embodiments, computing platform 900 may comprise any combination of a state machine 901, a processor 902, a memory 904, a network interface 906, an input/output (I/O) system 908, a user interface 910, and a storage system 912. In some embodiments, state machine 901 is implemented as part of processor 902 or as part of another controller specifically designed for operating a vehicle, such as an underwater vehicle. As can be further seen, a bus and/or interconnect is also provided to allow for communication between the various components listed above and/or other components not shown. Computing platform 900 can be coupled to a network 916 through network interface 906 to allow for communications with other computing devices, platforms, or resources. Other componentry and functionality not reflected in the block diagram of FIG. 9 will be apparent in light of this disclosure, and it will be appreciated that other embodiments are not limited to any particular hardware configuration.

Processor 902 can be any suitable processor and may include one or more coprocessors or controllers to assist in control and processing operations associated with computing platform 900. In some embodiments, processor 902 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core.

Memory 904 can be implemented using any suitable type of digital storage including, for example, flash memory and/or random access memory (RAM). In some embodiments, memory 904 may include various layers of memory hierarchy and/or memory caches as are known to those of skill in the art. Memory 904 may be implemented as a volatile memory device such as, but not limited to, a RAM, dynamic RAM (DRAM), or static RAM (SRAM) device. Storage system 912 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage system 912 may comprise technology to increase the storage performance enhanced protection for valuable digital media when multiple hard drives are included.

Processor 902 may be configured to execute an Operating System (OS) 914 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with computing platform 900, and therefore may also be implemented using any suitable existing or subsequently-developed platform.

Network interface 906 can be any appropriate network chip or chipset which allows for wired and/or wireless connection between other components of computing platform 900 and/or network 916, thereby enabling computing platform 900 to communicate with other remote computing systems, servers, cloud-based servers, and/or other resources. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks. In some embodiments, network interface 906 includes one or more acoustic transducers for communicating via acoustic waves through a water medium.

I/O system 908 may be configured to interface between various I/O devices and other components of computing platform 900. I/O devices may include, but not be limited to, a user interface 910. User interface 910 may include devices (not shown) such as a display element, touchpad, keyboard, mouse, and speaker, etc. I/O system 908 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 902 or any chipset of computing platform 900.

It will be appreciated that in some embodiments, the various components of the computing platform 900 may be combined or integrated in a system-on-a-chip (SoC) architecture. In some embodiments, the components may be hardware components, firmware components, software components or any suitable combination of hardware, firmware or software.

In various embodiments, computing platform 900 may be implemented as a wireless system, a wired system, or a combination of both. When implemented as a wireless system, computing platform 900 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, computing platform 900 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Some of the embodiments discussed herein may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., non-volatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

FURTHER EXAMPLE EMBODIMENTS

The following examples pertain to further embodiments, from which numerous permutations and configurations will be apparent.

Example 1 is a controller for use on board an underwater vehicle. The controller includes a state machine having a plurality of operating states for the underwater vehicle. Each of the plurality of operating states includes one or both of entrance criteria and exit criteria. The controller is configured to transition from executing a first operating state of the plurality of operating states to executing a second operating state of the plurality of operating states in response to the exit criteria of the first operating state and the entrance criteria of the second operating state both being met. The plurality of operating states includes a first portion of operating states associated with a first task for which the underwater vehicle is configured to perform, a second portion of operating states associated with a second task for which the underwater vehicle is configured to perform, and a third portion of operating states associated with both the first and second tasks for which the underwater vehicle is configured to perform.

Example 2 includes the subject matter of Example 1, wherein one or both of the entrance criteria and exit criteria of a given operating state is adaptable based on one or more detectable parameters.

Example 3 includes the subject matter of Example 2, wherein the one or more detectable parameters includes one or more of a measured depth of the underwater vehicle, a measured voltage level of one or more systems on board the underwater vehicle, or a measured temperature on board the underwater vehicle.

Example 4 includes the subject matter of Example 2 or 3, wherein the one or more detectable parameters includes one or more of an authentication received from another vehicle in proximity to the underwater vehicle or an indication of the presence of a surface vessel.

Example 5 includes the subject matter of any one of Examples 2-4, wherein the one or more detectable parameters are detectable by a sensor of the underwater vehicle.

Example 6 includes the subject matter of any one of Examples 1-5, wherein the underwater vehicle is a first underwater vehicle, and the plurality of operating states includes one or more multi-agent states that are configured to be activated in response to the first underwater vehicle identifying and teaming with a second underwater vehicle in proximity to the first underwater vehicle.

Example 7 includes the subject matter of any one of Examples 1-6, wherein at least one operating state in the third portion of operating states is configured to control movement of the underwater vehicle.

Example 8 includes the subject matter of any one of Examples 1-7, wherein at least one operating state in the third portion of operating states is configured to move the underwater vehicle to an extraction site.

Example 9 includes the subject matter of any one of Examples 1-8, wherein the controller is configured to generate a report that details what operating states were executed by the controller over a given time period.

Example 10 includes the subject matter of Example 9, wherein the report further includes a summary of which entrance and/or exit criteria were met for each of the executed operating states.

Example 11 includes the subject matter of any one of Examples 1-10, wherein the controller is further configured to determine if entrance criteria of more than one other operating state is met; determine which of the more than one other operating states has a highest priority; and transition to executing the operating state having the highest priority from the more than one other operating states.

Example 12 is a method of autonomously controlling an underwater vehicle. The method includes executing a first operating state of a plurality of operating states associated with the underwater vehicle; determining that exit criteria of the first operating state is met and that entrance criteria of a second operating state of the plurality of operating states is met; and in response to the determining, transitioning from executing the first operating state to executing the second operating state. The plurality of operating states includes a first portion of operating states associated with a first task for which the underwater vehicle is configured to perform, a second portion of operating states associated with a second task for which the underwater vehicle is configured to perform, and a third portion of operating states associated with both the first and second tasks for which the underwater vehicle is configured to perform.

Example 13 includes the subject matter of Example 12, further comprising adapting one or both of the exit criteria and the entrance criteria based on one or more detectable parameters.

Example 14 includes the subject matter of Example 13, wherein the one or more detectable parameters includes one or more of a measured depth of the underwater vehicle, a measured voltage level of one or more systems on board the underwater vehicle, or a measured temperature on board the underwater vehicle.

Example 15 includes the subject matter of Example 13 or 14, wherein the one or more detectable parameters includes one or more of an authentication received from another vehicle in proximity to the underwater vehicle or an indication of the presence of a surface vessel.

Example 16 includes the subject matter of any one of Examples 12-15, wherein the underwater vehicle is a first underwater vehicle, and the method further comprises detecting the presence of a second underwater vehicle in proximity to the first underwater vehicle; teaming with the second underwater vehicle; in response to the teaming, activating one or more multi-agent states of the plurality of operating states; and executing one or more of the one or more multi-agent states.

Example 17 includes the subject matter of any one of Examples 12-16, further comprising executing at least one operating state in the third portion of operating states to control movement of the underwater vehicle.

Example 18 includes the subject matter of any one of Examples 12-17, further comprising executing at least one operating state in the third portion of operating states to wirelessly transmit data using a transmitter onboard the underwater vehicle.

Example 19 includes the subject matter of any one of Examples 12-18, further comprising generating a report that details what operating states were executed over a given time period.

Example 20 includes the subject matter of Example 19, wherein the report further includes a summary of which entrance and/or exit criteria were met for each of the executed operating states.

Example 21 includes the subject matter of any one of Examples 12-20, further comprising determining if entrance criteria of more than one other operating state is met; determining which of the more than one other operating states has a highest priority; and executing the operating state having the highest priority from the more than one other operating states.

Example 22 is a computer program product including one or more non-transitory machine-readable mediums having instructions encoded thereon that, when executed by one or more processors, result in a plurality of operations for autonomously controlling an underwater vehicle. The operations include executing a first operating state of a plurality of operating states associated with the underwater vehicle; determining that exit criteria of the first operating state is met and that entrance criteria of a second operating state of the plurality of operating states is met; and in response to the determining, transitioning from executing the first operating state to executing the second operating state. The plurality of operating states includes a first portion of operating states associated with a first task for which the underwater vehicle is configured to perform, a second portion of operating states associated with a second task for which the underwater vehicle is configured to perform, and a third portion of operating states associated with both the first and second tasks for which the underwater vehicle is configured to perform.

Example 23 includes the subject matter of Example 22, wherein the operations further comprise adapting one or both of the exit criteria and the entrance criteria based on one or more detectable parameters.

Example 24 includes the subject matter of Example 23, wherein the one or more detectable parameters includes one or more of a measured depth of the underwater vehicle, a measured voltage level of one or more systems on board the underwater vehicle, or a measured temperature on board the underwater vehicle.

Example 25 includes the subject matter of Example 23 or 24, wherein the one or more detectable parameters includes one or more of an authentication received from another vehicle in proximity to the underwater vehicle or an indication of the presence of a surface vessel.

Example 26 includes the subject matter of any one of Examples 22-25, wherein the underwater vehicle is a first underwater vehicle, and the operations further comprise detecting the presence of a second underwater vehicle in proximity to the first underwater vehicle; teaming with the second underwater vehicle; in response to the teaming, activating one or more multi-agent states of the plurality of operating states; and executing one or more of the one or more multi-agent states.

Example 27 includes the subject matter of any one of Examples 22-26, wherein the operations further comprise executing at least one operating state in the third portion of operating states to control movement of the underwater vehicle.

Example 28 includes the subject matter of any one of Examples 22-27, wherein the operations further comprise executing at least one operating state in the third portion of operating states to wirelessly transmit data using a transmitter onboard the underwater vehicle.

Example 29 includes the subject matter of any one of Examples 22-28, wherein the operations further comprise generating a report that details what operating states were executed over a given time period.

Example 30 includes the subject matter of Example 29, wherein the report further includes a summary of which entrance and/or exit criteria were met for each of the executed operating states.

Example 31 includes the subject matter of any one of Examples 22-30, wherein the operations further comprise determining if entrance criteria of more than one other operating state is met; determining which of the more than one other operating states has a highest priority; and executing the operating state having the highest priority from the more than one other operating states.

Numerous specific details have been set forth herein to provide a thorough understanding of the embodiments. It will be appreciated, however, that the embodiments may be practiced without these specific details. In other instances, well known operations, components and circuits have not been described in detail so as not to obscure the embodiments. It can be further appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A controller for use on board an underwater vehicle, the controller comprising:
　a state machine comprising a plurality of operating states for the underwater vehicle, wherein each of the plurality of operating states includes one or both of entrance criteria and exit criteria;
　wherein the controller is configured to transition from executing a first operating state of the plurality of operating states to executing a second operating state of the plurality of operating states in response to the exit criteria of the first operating state and the entrance criteria of the second operating state both being met;
　wherein the plurality of operating states comprises a first portion of operating states associated with a first task for which the underwater vehicle is configured to perform, a second portion of operating states associated with a second task for which the underwater vehicle is configured to perform, and a third portion of operating states associated with both the first and second tasks for which the underwater vehicle is configured to perform; and wherein the underwater vehicle is a first underwater vehicle, and the plurality of operating states includes one or more multi-agent states that are configured to be activated in response to the first underwater vehicle identifying and teaming with a second underwater vehicle in proximity to the first underwater vehicle.

2. The controller of claim 1, wherein one or both of the entrance criteria and exit criteria of a given operating state is adaptable based on one or more detectable parameters.

3. The controller of claim 2, wherein the one or more detectable parameters includes one or more of a measured depth of the underwater vehicle, a measured voltage level of one or more systems on board the underwater vehicle, a measured temperature on board the underwater vehicle, an authentication received from another vehicle in proximity to the underwater vehicle, or an indication of the presence of a surface vessel.

4. The controller of claim 1, wherein at least one operating state in the third portion of operating states is configured to control movement of the underwater vehicle.

5. The controller of claim 1, wherein the controller is configured to generate a report that details what operating states were executed by the controller over a given time period, wherein the report further includes a summary of which entrance and/or exit criteria were met for each of the executed operating states.

6. The controller of claim 1, wherein the controller is further configured to:
determine if entrance criteria of more than one other operating state is met;
determine which of the more than one other operating states has a highest priority; and
transition to executing the operating state having the highest priority from the more than one other operating states.

7. A method of autonomously controlling an underwater vehicle, the method comprising:
executing a first operating state of a plurality of operating states associated with the underwater vehicle;
determining that exit criteria of the first operating state is met and that entrance criteria of a second operating state of the plurality of operating states is met; and
in response to the determining, transitioning from executing the first operating state to executing the second operating state;
wherein the plurality of operating states comprises a first portion of operating states associated with a first task for which the underwater vehicle is configured to perform, a second portion of operating states associated with a second task for which the underwater vehicle is configured to perform, and a third portion of operating states associated with both the first and second tasks for which the underwater vehicle is configured to perform; and
wherein the underwater vehicle is a first underwater vehicle, and the method further comprises:
detecting the presence of a second underwater vehicle in proximity to the first underwater vehicle;
teaming with the second underwater vehicle;
in response to the teaming, activating one or more multi-agent states of the plurality of operating states; and
executing one or more of the one or more multi-agent states.

8. The method of claim 7, further comprising adapting one or both of the exit criteria and the entrance criteria based on one or more detectable parameters.

9. The method of claim 8, wherein the one or more detectable parameters includes one or more of a measured depth of the underwater vehicle, a measured voltage level of one or more systems on board the underwater vehicle, a measured temperature on board the underwater vehicle, an authentication received from another vehicle in proximity to the underwater vehicle, or an indication of the presence of a surface vessel.

10. The method of claim 7, further comprising executing at least one operating state in the third portion of operating states to control movement of the underwater vehicle.

11. The method of claim 7, further comprising executing at least one operating state in the third portion of operating states to wirelessly transmit data using a transmitter onboard the underwater vehicle.

12. The method of claim 7, further comprising generating a report that details what operating states were executed over a given time period, wherein the report further includes a summary of which entrance and/or exit criteria were met for each of the executed operating states.

13. The method of claim 7, further comprising:
determining if entrance criteria of more than one other operating state is met;
determining which of the more than one other operating states has a highest priority; and
executing the operating state having the highest priority from the more than one other operating states.

14. A computer program product including one or more non-transitory machine-readable mediums having instructions encoded thereon that, when executed by one or more processors, result in a plurality of operations for autonomously controlling an underwater vehicle, the operations comprising:
executing a first operating state of a plurality of operating states associated with the underwater vehicle;
determining that exit criteria of the first operating state is met and that entrance criteria of a second operating state of the plurality of operating states is met; and
in response to the determining, transitioning from executing the first operating state to executing the second operating state;
wherein the plurality of operating states comprises a first portion of operating states associated with a first task for which the underwater vehicle is configured to perform, a second portion of operating states associated with a second task for which the underwater vehicle is configured to perform, and a third portion of operating states associated with both the first and second tasks for which the underwater vehicle is configured to perform; and
wherein the underwater vehicle is a first underwater vehicle, and the operations further comprise:
detecting the presence of a second underwater vehicle in proximity to the first underwater vehicle;
teaming with the second underwater vehicle;
in response to the teaming, activating one or more multi-agent states of the plurality of operating states; and
executing one or more of the one or more multi-agent states.

15. The computer program product of claim 14, wherein the operations further comprise adapting one or both of the exit criteria and the entrance criteria based on one or more detectable parameters.

16. The computer program product of claim 15, wherein the one or more detectable parameters includes one or more of a measured depth of the underwater vehicle, a measured voltage level of one or more systems on board the underwater vehicle, a measured temperature on board the underwater vehicle, an authentication received from another vehicle in proximity to the underwater vehicle, or an indication of the presence of a surface vessel.

17. The computer program product of claim 14, wherein the operations further comprise:
- determining if entrance criteria of more than one other operating state is met;
- determining which of the more than one other operating states has a highest priority; and
- executing the operating state having the highest priority from the more than one other operating states.

* * * * *